Patented Feb. 10, 1925.

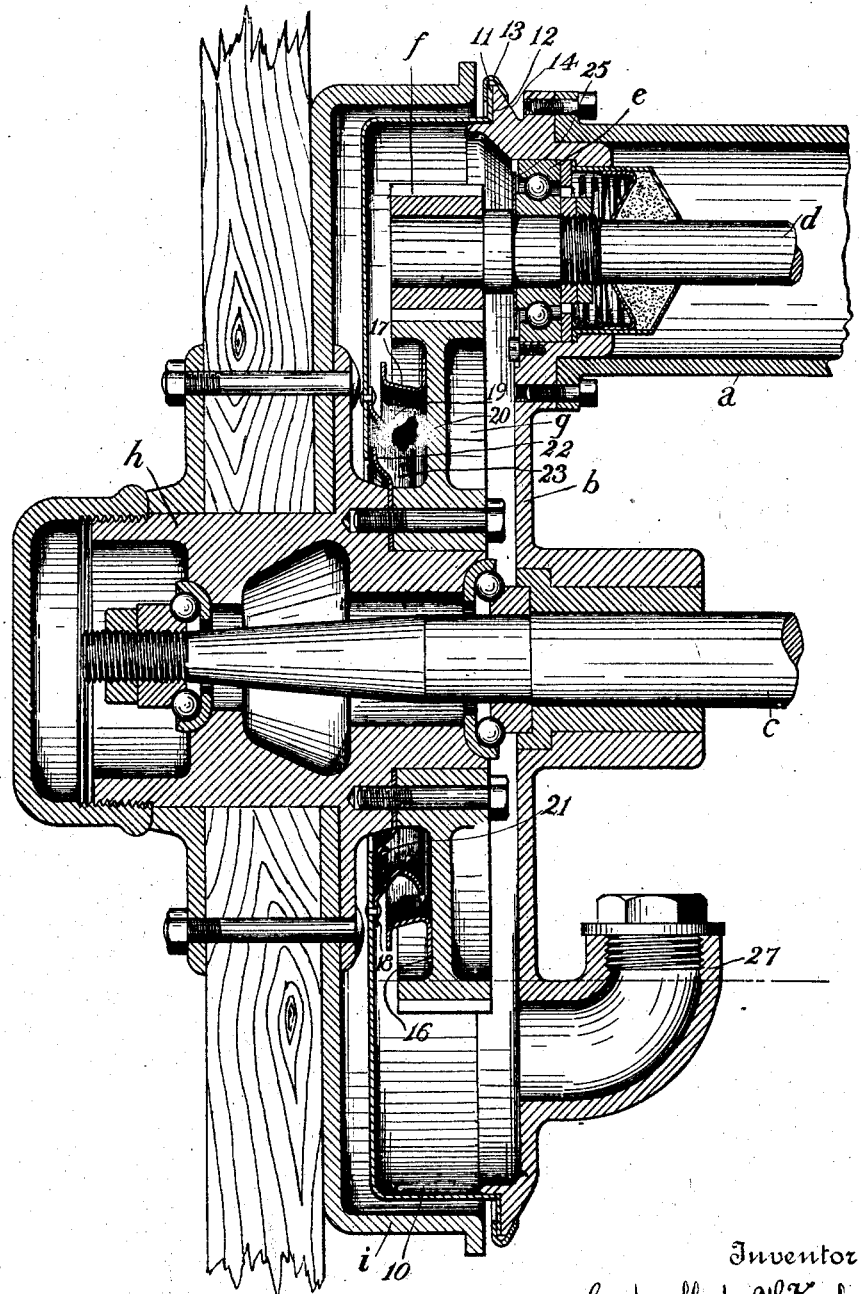

1,525,555

UNITED STATES PATENT OFFICE.

CADWALLADER W. KELSEY, OF SHORT HILLS, NEW JERSEY.

OIL CASE FOR GEARING.

Application filed December 13, 1919. Serial No. 344,649.

*To all whom it may concern:*

Be it known that I, CADWALLADER W. KELSEY, a citizen of the United States, and a resident of Short Hills, in the county of Essex and State of New Jersey, have invented certain new and useful Improvements in an Oil Case for Gearing, of which the following is a specification.

This invention relates to an oil case for gearing and is particularly adapted to use in automobile construction for housing and lubricating the gearing between the drive shaft and a traction wheel of an automobile. It has as its object to provide an improved oil case for this purpose which is efficient in that it will prevent the leakage of lubricant therefrom. The improved oil case is of very simple construction, has no contact with relatively movable parts so that wear and friction are entirely eliminated, and does away with the necessity of packing, stuffing boxes, and the like.

In the accompanying drawing, the figure is a sectional view of so much of a drive for a traction wheel as is necessary to disclose the application of the present invention thereto.

Referring to this drawing, $a$ designates part of the axle housing of an automobile; $b$, a bracket or plate secured on one end of the housing; $c$, a non-rotatable shaft extending through the bracket $b$ and upon the outer end of which is rotatably mounted the traction wheel; $d$, a drive shaft supported in a suitable bearing $e$ on the bracket $b$ and having on its outer end a pinion $f$ meshing with the gear $g$ fixed to the hub $h$ of the traction wheel; and $i$ is the usual brake drum secured to the wheel.

In the present instance, I have shown for illustrative purposes the pinion $f$ as meshing with the external teeth on the gear $g$, but it is to be understood that the present invention is not limited to any particular form of reduction gearing between the drive shaft and the traction wheel, and if desired the construction may be such that the pinion $f$ meshes with internal teeth on the gear $g$.

The construction just described is old and well-known, it being illustrated for the purpose of showing the application of my improved oil case which will now be described.

This case consists in part of a cup-shaped member 10 spaced from but fitting within the brake drum $i$, and having an outer wall $10^a$ positioned between the reduction gearing and the brake drum and provided with an opening which is but slightly greater than the diameter of the wheel hub which it receives. The member 10 also includes the annular flange $10^b$ extending laterally from the periphery of the wall $10^a$. The flange $10^b$ has a flat edge flange 11 abutting against a flat face of a flange 12 on the bracket $b$, which bracket in the present instance constitutes the cover of the oil case. Fitting about the edges of the abutting flanges 11 and 12 is a binding strip 13 which may be in the form of a split channeled ring. The face 14 of the flange 12 is inclined so that the edge of this flange is wedged shape in cross section, the result being that when the ends of the split ring 13 are drawn together the abutting faces of the flanges will be forced into close contact to form a tight joint.

It will be seen that by the construction so far described, the only place of escape for the lubricant would be immediately around the wheel hub, and to prevent this means are provided on the gear, the cup-shaped member and the wheel hub for catching any lubricant which may flow downwardly between the gear and the outer wall of the cup-shaped member.

In the present instance, there is shown secured to the hub of the gear $g$ in any suitable manner, as by means of rivets, a channel member 16 for convenience called the outer channel member having an outwardly facing channel 17 which will catch any lubricant flowing down the outside surface of the gear $g$. On the cup-shaped member 10 is a channel member 18 called the inner channel member having an outwardly facing channel 19 which will catch any lubricant flowing down the wall of the cup-shaped member 10 and conduct the same to the bottom of the oil case. The channel member 18, is preferably within the channel member 16, as shown, so that any lubricant which may overflow from the channel 17, or which may drip off of the surface of the member 16 will be caught by the channel 19.

It will be noted that one wall of the member 18 is at an angle to the member 10 and extends inwardly towards the axis of the wheel so as to provide an inwardly facing channel 20, which in its lower half, i. e., below the hub $h$, communicates with the channel 19 by means of apertures 21. Carried by the hub of the wheel is a throwing fin 22 which prevents any lubricant that may reach the hub of the gear *g* from flowing out of the case through the opening between the cup-shaped member and the hub of the wheel. This member 22 is in the form of an annular plate having its inner and outer peripheries disposed relatively so as to form an ogee curve in cross section so that its outer edge is in vertical alinement with the channel 20.

The member 22 and the hub of the gear *g* form an outwardly facing channel 23. As the hub of the gear is fixed to the hub of the wheel, for the purpose of terminology in the claim, the channel 23 may be referred to as being in the hub of the wheel. This channel 23 will catch any lubricant which may flow down the inwardly facing surface of the member 16 and the web of the gear *g* within this member, and the ring 22 serves to direct the lubricant, as it is thrown from the channel 23 by the centrifugal force, into the channel 20 from which it escapes through the openings 21 into the bottom of the oil case.

For the purpose of preventing an excess of oil gaining access to the bearing *e* in which the shaft *d* is supported, there is fixed to the shaft *d*, so as to rotate therewith, a disk 25 which is of such diameter as to extend beyond the space between the races of the bearing *e*. With this construction, a sufficient amount of oil may escape about the edge of the disk 25 to keep the ball bearing in a proper lubricated condition, but any excess of oil is prevented from finding its way to this bearing.

The lubricant may be fed into the oil case through the elbow 27 extending from the lower part of the bracket *b*. The upper end of this elbow is at about the same level as that at which the oil in the case is to be maintained.

While the form of device herein shown and described is admirably adapted to fulfil the object of the invention, it is to be understood that it is not intended to confine the invention to the exemplification shown as it is susceptible of embodiment in various forms all coming within the scope of the claims which follow.

I claim as my invention:—

1. In a traction wheel, driving gears, a casing enclosing said gears and including a wall interposed between the gears and the wheel, and annular deflectors on the wall and one of said gears, whereby to contain lubricant so that the gears are continually supplied while leakage is effectively prevented.

2. In a traction wheel including a hub portion, driving gears, a casing enclosing said gears and having an opening through which the hub portion extends, and concentric channel-section annular deflectors carried by the casing and one of said gears, and a co-operative annular fin mounted on the hub portion for throwing lubricant flowing along said hub portion and gears back into the casing.

3. In a traction wheel including a hub portion, driving gears, a casing enclosing said gears and having an opening through which the hub portion extends, an annular channel member carried by said casing, and a co-operative ogee deflector for throwing lubricant flowing along the hub portion into the channel member whereby the lubricant is returned to the casing.

4. In a traction wheel including a hub portion, driving gears, a casing enclosing said gears and having an opening through which the hub portion extends, a channel member secured to the inner face of the casing, and an annular fin mounted on the hub portion and having its periphery directed toward the channel member so that during rotation of the wheel any lubricant flowing along the hub portion is thrown by centrifugal force onto the channel member and subsequently returned to the casing.

5. In a traction wheel, including a hub portion, driving gears one of which is fixed to the hub portion, a casing enclosing the gears and having a wall interposed between the gears and wheel, said wall having a center hub receiving opening, a centrifugal throwing means carried by the hub portion, means mounted on a casing wall adapted to receive oil thrown by said centrifugal means and to receive oil flowing down the casing wall by gravity to direct the oil away from the center opening.

6. In a traction wheel including a hub portion, driving gears, a casing enclosing the gears having a wall interposed between the gears and wheel and having a center opening through which the hub portion extends, means on the hub portion for throwing oil radially, and an annular member affixed to the casing wall and having inner and outer channels, the former to receive oil thrown by said throwing means and the latter to receive oil flowing by gravity along the casing walls and to direct the flowing oil away from the center opening.

7. In a traction wheel including a hub portion, driving gears one of which is fixed to the hub portion, a casing enclosing the gears and including a wall interposed between said gears and the wheel, the wall having a center opening through which the hub portion extends, and a pair of annular members one of which is affixed to said wall and the other to the fixed gear and having outer channels whereby to receive and conduct oil flowing by gravity along the wall and gear and to conduct the same to the lower portion of the casing.

8. In a traction wheel, driving gears, a casing enclosing the gears, an annular channel member mounted concentrically on the face of one of said gears to receive oil flowing along the same and to conduct the oil by gravity to the lower portion of the casing, and an annular flange formed on the outer edge of the channel member extending beyond the plane of the gear to throw oil radially against the sides of the casing.

9. In a traction wheel, driving and driven gears, a connecting and supporting plate for said gears having an angular section peripheral flange, a casing member open at one side and having an annular flange abutting the peripheral flange of the plate, and an annular wedge section embracing ring clamping simultaneously the angular section flange and the edge of the casing flange to secure the casing member in place.

CADWALLADER W. KELSEY.